US010733784B2

United States Patent
Wolf

(10) Patent No.: US 10,733,784 B2
(45) Date of Patent: Aug. 4, 2020

(54) METHODS AND APPARATUSES FOR IMAGE CONTROL AND DISPLAY OF PARTICLE ANALYZER IMAGES

(71) Applicant: Becton, Dickinson and Company, Franklin Lakes, NJ (US)

(72) Inventor: Christopher J. Wolf, San Jose, CA (US)

(73) Assignee: BECTON, DICKINSON AND COMPANY, Franklin Lakes, NJ (US)

(*) Notice: Subject to any disclaimer, the term of this patent is extended or adjusted under 35 U.S.C. 154(b) by 0 days.

(21) Appl. No.: 16/395,071

(22) Filed: Apr. 25, 2019

(65) Prior Publication Data

US 2019/0333264 A1    Oct. 31, 2019

Related U.S. Application Data

(60) Provisional application No. 62/663,758, filed on Apr. 27, 2018.

(51) Int. Cl.
| | | |
|---|---|---|
| G06T 15/00 | (2011.01) | |
| G06T 15/04 | (2011.01) | |
| G01N 15/14 | (2006.01) | |
| G06T 5/00 | (2006.01) | |
| G01N 15/10 | (2006.01) | |

(52) U.S. Cl.
CPC ....... G06T 15/005 (2013.01); G01N 15/1429 (2013.01); G01N 15/1468 (2013.01); G06T 5/002 (2013.01); G06T 15/04 (2013.01); G01N 2015/1006 (2013.01); G06T 2200/24 (2013.01); G06T 2207/10064 (2013.01); G06T 2207/30024 (2013.01)

(58) Field of Classification Search
CPC combination set(s) only.
See application file for complete search history.

(56) References Cited

U.S. PATENT DOCUMENTS

| | | | |
|---|---|---|---|
| 9,423,353 B2 | 8/2016 | Diebold et al. | |
| 2001/0041347 A1* | 11/2001 | Sammak | G01N 33/5076 435/7.23 |
| 2010/0167811 A1* | 7/2010 | Denham | G07F 17/322 463/25 |
| 2016/0369329 A1* | 12/2016 | Cai | C12Q 1/6841 |
| 2017/0212983 A1* | 7/2017 | Cai | G16B 40/00 |

OTHER PUBLICATIONS http://eds.a.ebscohost.com/eds/resultsadvanced?vid=3&sid=7efb6667-3261-4d0a-87d0-89 . . . , pp. 1-9 (Year: 2020).*
Scientific and Technical Information Center search result, May 22, 2020, pp. 1-32 (Year: 2020).*
Khronos Group, Apr. 24, 2018 WebGL 2.0 Specification, Editor's Draft Wed Apr. 4 15:13:36 2018 +0300, 21 pp.

* cited by examiner

*Primary Examiner* — Wesner Sajous
(74) *Attorney, Agent, or Firm* — Khin K. Chin; Bret E. Field; Bozicevic, Field & Francis LLP

(57) ABSTRACT

Some embodiments include an apparatus for processing radio frequency multiplexed cell images such as single-cell images, for example radio frequency multiplexed excitation (FIRE) images. The images can be from a particle analyzer, such as a flow and scanning cytometer or a laser scanning microscope. Some embodiments include an apparatus for displaying radio frequency multiplexed cell images such as FIRE images.

20 Claims, 6 Drawing Sheets

Image Wall with mouse over and instant zooming

Image Wall after smoothing and thresholding

Image Wall - Default

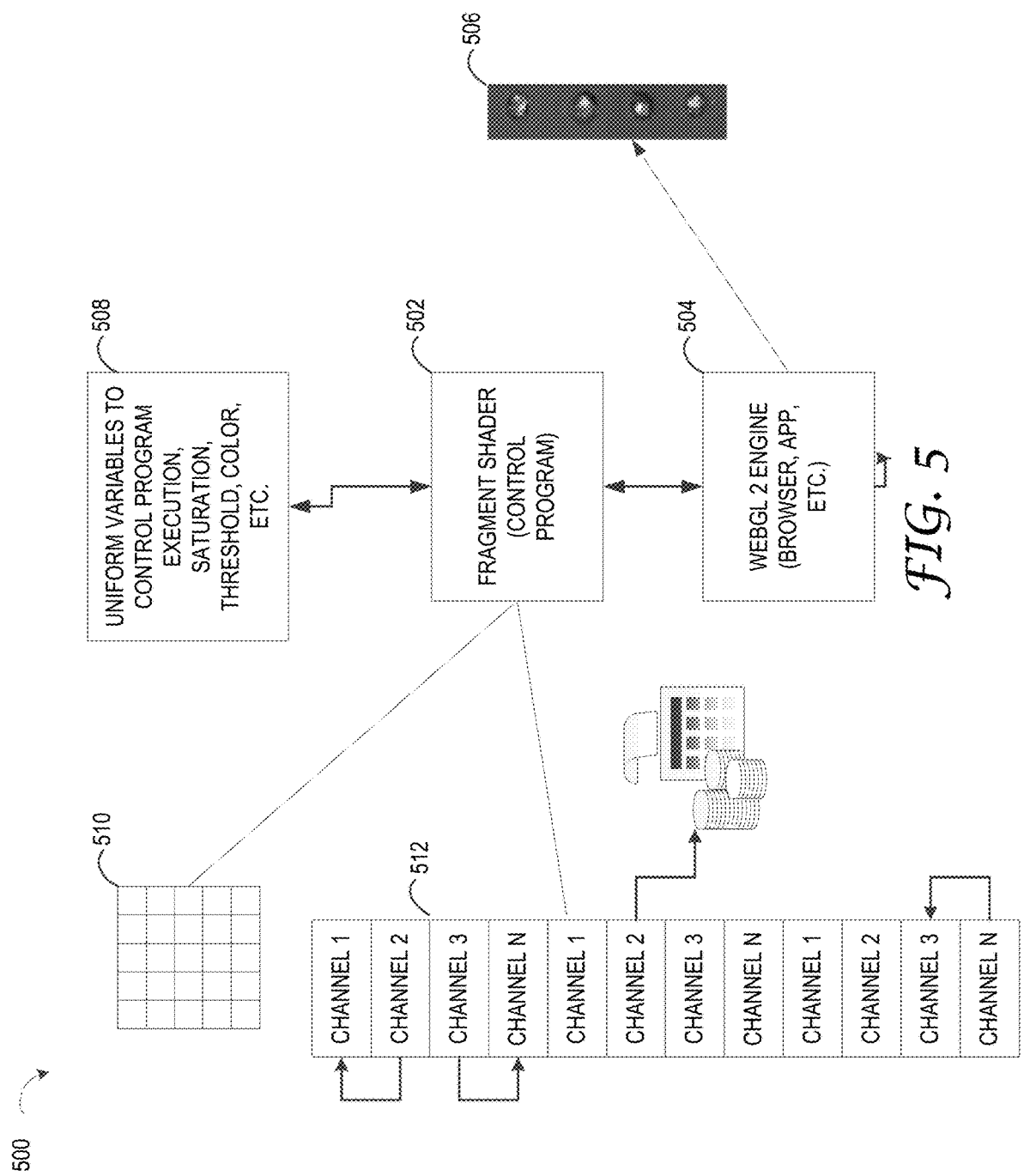

METHODS AND APPARATUSES FOR IMAGE CONTROL AND DISPLAY OF PARTICLE ANALYZER IMAGES

CROSS-REFERENCE TO RELATED APPLICATIONS

This application claims the benefit of U.S. Provisional Application No. 62/663,758 filed Apr. 27, 2018, titled "IMAGE CONTROL AND DISPLAY FOR FIRE DATA IMAGES," the content of which is hereby incorporated by reference in its entirety for all purposes.

FIELD

The present development relates to displaying images alongside related flow cytometry data and, specifically, to a user-interface to enable efficient viewing and manipulation of images and corresponding flow data.

BACKGROUND

Particle analyzers, such as flow and scanning cytometers, are analytical tools that enable the characterization of particles on the basis of optical parameters such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

One technique for fluorescence imaging uses radio frequency-multiplexed excitation laser microscopy. Such techniques permit optical interrogation of a sample. An example apparatus and method for generating images is described in U.S. Pat. No. 9,423,353, which is incorporated by reference in its entirety herein.

SUMMARY

The systems, methods, and devices of this disclosure each have several innovative aspects, no single one of which is solely responsible for the desirable attributes disclosed herein.

Some embodiments include an apparatus for processing radio frequency multiplexed cell images. The apparatus comprises an input interface configured to receive an input data stream from a particle analyzer, wherein the input data stream comprises a plurality of raw cell images, wherein each raw cell image comprises a plurality of pixels and at least two or more data channels corresponding to each pixel in the raw cell image. The apparatus further comprises a processor comprising a hardware pipeline, a fragment shader, and a filter kernel. The fragment shader comprises one or more programs that configure the hardware pipeline to parallel process the at least two or more data channels of raw cell image data to generate processed cell images. The filter kernel is configured to filter each pixel in each raw cell image. The processor is configured to perform at least one of thresholding, saturation, or gamma correction after said filtering, to produce a processed pixel value for the pixel. In some embodiments, the particle analyzer further comprises a laser scanning microscope or other fluorescence imager. In some embodiments, the apparatus comprises the particle analyzer and/or the laser scanning microscope.

In the apparatus of some embodiments, the filter kernel comprises a texture for application to a channel of the two or more channels of each pixel. In the apparatus of some embodiments, the one or more programs of the fragment shader are further configured to write each channel of the input data stream into a display buffer. In the apparatus of some embodiments, the apparatus further comprises a user interface device configured to present a user with a control panel that enables the user to change one or more parameters to modify one or more of the generated raw or processed cell images. In the apparatus of some embodiments, the processor is further configured to render the processed cell image for display on a display device. In some embodiments, the apparatus further comprises a display device configured to display the processed cell image. In the apparatus of some embodiments, the processor is further configured to generate an image wall comprising a plurality of the raw or processed cell images, generate a control panel to enable a user to change one or more parameters to modify one or more of the raw or processed cell images of the image wall, render the image wall and the control panel for simultaneous display on the display device, identify one or more parameters changed by the user via the control panel while the user is changing the one or more parameters, modify each of the cell images of the image wall according to the one or more identified parameters changed by the user within a millisecond-scale interval of the user changing the one or more parameters, and render the modified cell images of the image wall for display on the display device, wherein the display device is further configured to display the modified cell images of the image wall as the user is making changes to the one or more parameters. In the apparatus of some embodiments, the processor comprises or consists of a graphics processing unit (GPU) comprising the hardware pipeline. In the apparatus of some embodiments, the processor comprises a central processing unit (CPU) and a graphics processing unit (GPU), the GPU comprising the hardware pipeline.

Some embodiments include an apparatus for displaying radio frequency multiplexed cell images. The apparatus comprises an input interface configured to receive an input data stream from a particle analyzer, wherein the input data stream comprises raw cell images, wherein each raw cell image comprises a plurality of pixels and at least two or more data channels corresponding to each pixel in the raw cell image. The apparatus further comprises a processor. The processor is configured to generate an image wall comprising a plurality of the raw cell images and generate a control panel to enable a user to change one or more parameters to modify one or more of the raw cell images of the image wall. The apparatus further comprises a display device configured to display one or more objects rendered for display on the display device. The processor is further configured to render the image wall and the control panel for simultaneous display on the display device, identify one or more parameters changed by the user via the control panel while the user is changing the one or more parameters, modify each of the raw cell images of the image wall according to the one or more identified parameters changed by the user within a millisecond-scale interval of the user changing the one or more parameters, and render the modified cell images of the image wall for display on the display device. The display device is further configured to display the modified cell images of the image wall as the user is making changes to the one or more parameters.

In the apparatus of some embodiments, the millisecond-scale interval comprises an interval of no more than 1 millisecond, 2 milliseconds, 3 milliseconds, 5 milliseconds, or 10 milliseconds. In the apparatus of some embodiments, the processor comprises a hardware pipeline. In the apparatus of some embodiments, the processor is configured to implement a fragment shader program on the hardware pipeline and the fragment shader program comprises one or more programs that configure the hardware pipeline for parallel processing of two of more channels of a pixel of the input data stream to generate a processed pixel and/or cell image. In the apparatus of some embodiments, the processing comprises filtering each pixel with a filter kernel and, after said filtering, performing at least one of thresholding, saturation, or gamma correction to produce a processed pixel value for the pixel. In the apparatus of some embodiments, the processor comprises a graphics processing unit (GPU) comprising the hardware pipeline, the GPU configured to implement the fragment shader program. In the apparatus of some embodiments, the processor comprises a graphics processing unit (GPU) comprising the hardware pipeline and a central processing unit (CPU) configured to implement the fragment shader program. In the apparatus of some embodiments, the input data stream comprises data obtained from fluorescence imaging, Raman spectroscopy, or a combination thereof. In the apparatus of some embodiments, the cell images comprise fluorescence imaging using radio frequency multiplexed excitation (FIRE) images.

Some embodiments include a method of displaying radio frequency multiplexed cell images. The method comprises receiving an input data stream sourced from a particle analyzer. The input data stream comprises a plurality of raw cell images, wherein each raw cell image comprises a plurality of pixels and at least two or more data channels corresponding to each pixel in the raw cell image. The method further comprises implementing a fragment shader comprising one or more programs to parallel process two of more channels of a pixel of the input data stream, said parallel processing comprising filtering a pixel with a filter kernel, and thereafter performing at least one of thresholding, saturation, and gamma correction to produce a processed pixel value for the pixel. The method also comprises generating a processed cell image based on the parallel processing of the two or more channels of the pixel of the input data stream.

In the method of some embodiments, the filter kernel comprises a texture for application to one or more channels of the two or more channels of the pixel. In the method of some embodiments, the parallel processing comprises applying the filter kernel in a convolution operation comprising a smoothing operation. In the method of some embodiments, implementing the one or more programs of the fragment shader comprises writing each channel of the input data stream into a display buffer. In some embodiments, the method further comprises presenting a user with a control panel that enables the user to change one or more parameters to modify one or more of the generated processed pixels and/or cell images. In some embodiments, the method further comprises rendering the processed pixel and/or cell image for display on a display device. In some embodiments, the method further comprises generating an image wall comprising the plurality of raw cell images, generating a control panel to enable a user to change one or more parameters to modify one or more of the raw processed cell images of the image wall, rendering the image wall and the control panel for simultaneous display on the display device identify one or more parameters changed by the user via the control panel while the user is changing the one or more parameters, modifying each of the cell images of the image wall according to the one or more identified parameters changed by the user within a millisecond-scale interval of the user changing the one or more parameters, rendering the modified cell images of the image wall for display on the display device, and displaying the modified cell images of the image wall as the user is making changes to the one or more parameters. In some embodiments, the method further comprises displaying cytometry data (e.g., flow cytometry data) in addition to the modified cell images, in which the cytometry data comprises single cell data corresponding one-to-one to the cells of the modified cell images. In some embodiments, the method further comprises displaying cytometry data (e.g., flow cytometry data) in addition to the modified cell images, in which the cytometry data comprises data for a population of cells.

Some embodiments include a method of displaying radio frequency multiplexed cell images. The method comprises receiving an input data stream sourced from a particle analyzer, the input data stream comprising a plurality of raw cell images. Each raw cell image comprises a plurality of pixels and at least two or more data channels corresponding to each pixel in the raw cell image. The method further comprises generating an image wall comprising the plurality of raw cell images and generating a control panel to enable a user to change one or more parameters to modify one or more of the raw cell images of the image wall. The method also comprises rendering the image wall and the control panel for simultaneous display on the display device and identifying one or more parameters changed by the user via the control panel while the user is changing the one or more parameters. The method additionally comprises modifying each of the raw cell images of the image wall according to the one or more identified parameters changed by the user within a millisecond-scale interval of the user changing the one or more parameters, rendering the modified cell images of the image wall for display on the display device, and displaying the modified cell images of the image wall as the user is making changes to the one or more parameters. In some embodiments, the method further comprises displaying cytometry data (e.g., flow cytometry data) in addition to the modified cell images, in which the cytometry data comprises single cell data corresponding one-to-one to the cells of the modified cell images. In some embodiments, the method further comprises displaying cytometry data (e.g., flow cytometry data) in addition to the modified cell images, in which the cytometry data comprises data for a population of cells.

In the method of some embodiments, the millisecond-scale interval comprises an interval of no more than 1 millisecond, 2 milliseconds, 3 milliseconds, 5 milliseconds, or 10 milliseconds. In the method of some embodiments, the input data stream comprises data obtained from fluorescence imaging, Raman spectroscopy, or a combination thereof. In the method of some embodiments, the raw cell images comprise fluorescence imaging using radio frequency multiplexed excitation (FIRE) images or Raman spectroscopy imaging images.

Additional embodiments relate to non-transitory, computer-readable storage media storing.

BRIEF DESCRIPTION OF THE DRAWINGS

Embodiments of various inventive features are described with reference to the following drawings. Throughout the drawings, reference numbers may be re-used to indicate correspondence between referenced elements. The drawings are provided to illustrate example embodiments described herein and are not intended to limit the scope of disclosure.

FIG. 5 shows a system diagram of a system of components for displaying and manipulating cell images as viewed by a user computing device of FIG. 1.

DETAILED DESCRIPTION

Figure 1:
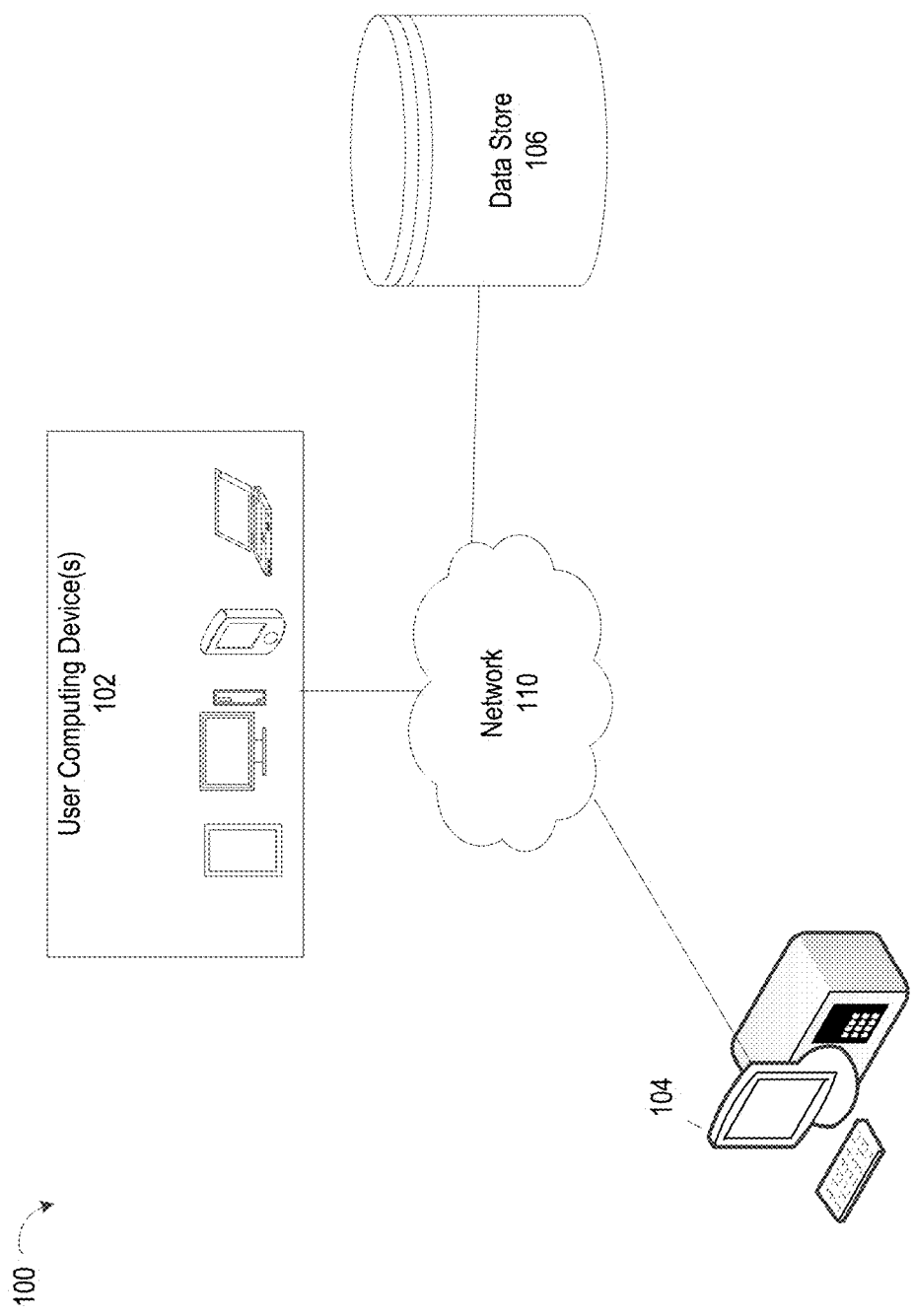
FIG. 1 illustrates one embodiment of cell image system (system), as described herein, that allows users to capture, view, and manipulate cell images alongside corresponding particle analysis data.

In various embodiments, particle analyzers, and similar devices, generate cell images (for example, radio frequency multiplexed cell images, such as Fluorescence Imaging using Radio frequency multiplexed Excitation (FIRE) images). The generated cell images may comprise and depict various aspects of the cells being analyzed. The cell images may be viewed alongside particle analysis data (for example, intensity measurements and so forth). A cell image can be very large in terms of data size and may be represented using multiple channels of data that are composited or combined to generate the image based on various computations, processes, and techniques. Conventionally, the large size of the image files may make it difficult to process, display, and manipulate these images quickly enough to allow a user to view the images simultaneously with the corresponding cell flow processing on a particle analyzer.

In one embodiment, the image processing system described herein provides a user interface that provides for quickly displaying the image files following image manipulation. For example, the user may adjust one or more aspects of the image files in real time, or near real time and be able to view the image updates on images as they being captured by the particle analyzer. In accordance with some embodiments, a system, apparatus, module, or hardware processor performing image processing to generate the image files for display may process the image files in sub-millisecond times to enable a user working with the image files to simultaneously work with the image files and any corresponding particle analysis data. In some embodiments, the user-interface (UI) that controls the algorithms provides controls to perform instantaneous adjustments to the display of one or more cell images in a footprint that is conducive to simultaneous viewing of the image files.

In some embodiments, an input image data stream generated by the particle analyzer or similar device includes data for multiple images. By way of example, the images can be generated by a laser scanning microscope or other fluorescence imaging apparatus. A user reviewing the images along with corresponding flow cytometry data (which, for conciseness may also be referred to herein as "flow data") may thus have a large number of images to review in a short period of time. Some embodiments include an image processing system that allows reviewing of the images and the corresponding flow data. The system may include highly efficient processing to allow the user to introduce adjustments to one or more of the images and have the images be updated in real-time, or near real time, as the user makes the adjustments via a control panel.

In some embodiments, the input image data stream received from the particle analyzer or similar device comprises a plurality of raw cell images. A raw cell image (or any cell image, for example raw, processed, or modified, as described herein) can comprise one or more pixels. Each pixel of each cell image may comprise at least two data channels as obtained from the particle analyzer. As such, it will be appreciated that an image (for example an image of a cell), such as an adjusted or modified image as described herein, can comprise or consist of one or more pixels.

In one embodiment, some of the efficiencies and enhancements in the image processing speed are achieved by parallel processing of images and/or pixels of the images. As detailed further herein, the methods and apparatus described herein may permit the user to simultaneously make adjustments to images while viewing those adjustments to the images with minimal (for example, only millisecond-scale timeframe) delays between indicating an adjustment and having a display show the adjusted image. Thus, in addition to performing transformations (for example, the adjustments and/or modifications) on images being displayed, the image processing system and methods described herein may provide efficient processing capabilities and a nimble user interface experience.

The methods, systems, and apparatuses described herein provide a user (for example, the researcher described herein) to adjust one or more image parameters using an intuitive UI and quickly observe the results of the image parameter adjustments. Such methods, systems, and apparatuses may enhance efficiencies of research and other analysis associated with the cell images and the corresponding particle analysis data by reducing processing and rendering time losses resulting from the image parameter adjustments. For example, the methods, systems, and apparatuses described herein provide for the processing and rendering of the cell images to occur in millisecond-scale timeframes per image, for example, within less than 10, 9, 8, 7, 6, 5, 4, 3, 2, or 1 milliseconds per image. Accordingly, the user may more rapidly and efficiently view and manipulate the cell images during examination and/or analysis.

FIG. 1 illustrates embodiments of a cell image processing apparatus or system 100, as described herein, that allows users to capture, view, and manipulate cell images alongside corresponding particle analysis data. The system 100 comprises a user computing device (user device, which may also be referred to herein as an "apparatus") 102, a particle analyzer 104, a data store 106, and a network 110. The user device 102, the particle analyzer 104, and the data store 106 may communicate with each other via the network 110 and communication links shown therebetween.

The user devices 102 may comprise any mobile or stationary computing device of a user, for example a server, a laptop computer, a smart mobile device, a personal digital assistant, and a tablet computer, among others. In some embodiments, the user device 102 operates in the system 100 to enable the user to control (1) image acquisition by the particle analyzer 104 or (2) image and/or data viewing/manipulation on the user device 102 of cell images captured by or stored in the particle analyzer 104 or stored in the data store 106 and corresponding particle analysis data.

In some embodiments, the user device 102 includes an application, browser, or other software (for conciseness, this collection of terms may be referred to as "app") through which the user interacts with the particle analyzer 104 and/or the stored or captured cell images. Said interaction may comprise adjustment of one or more image parameters, control of image acquisition and/or sharing by the particle analyzer 104, and/or storage of the cell images in the data store 106. Accordingly, the app may provide the user with an interface for adjusting the one or more image parameters, a viewer for viewing the results of said adjustment of the one or more image parameters, and controls for storing one or more of the adjusted one or more image parameters, the original cell images, and the adjusted cell images, as well as the corresponding particle analysis data. In some embodiments, a history of adjustments to the one or more image parameters, original cell images, cell images resulting from said adjustments, and/or the corresponding particle analysis data is stored locally in, on, or associated with the user device 102 or stored in the data store 106 or in the particle analyzer 104. The methods, apparatuses, and systems described herein may be performed or operable by the user device 102.

The particle analyzer 104 may comprise any device that enables the characterization of particles based on one or more optical parameters (for example, light scatter and fluorescence). In some embodiments, the particle analyzer 104 comprises a monitor or other user interface and is electronically connected to a data storage device, such as the data store 106, in which the particle analyzer 104 stores one or more data streams corresponding to one or more analyzed cells. The methods, systems, and apparatuses described herein may be performed or operable by components within, or in electrical communication with, the particle analyzer 104. The particle analyzer 104 may be configured to generate data in response to analyzing cells, particles, or components thereof (for example, a flow and scanning cytometer or a laser scanning microscope or other fluorescence imaging apparatus, and so forth). Example methods and apparatuses of particle analysis comprising flow cytometry and cell imaging apparatuses are described in U.S. Pat. No. 9,423,353, the entirety of which is incorporated by reference herein for all purposes. For example, the apparatus for fluorescence imaging described in FIGS. 1, 2A, and 2B of U.S. Pat. No. 9,423,353 can be a suitable apparatus for collecting cytometer data and raw cell images for some embodiments herein. In some embodiments, the particle analysis is performed on a system comprising a flow cytometer and a laser scanning fluorescence microscope. In some embodiments, the particle analyzer may include the image processing system that allows a user to adjust the one or more image parameters, a viewer for viewing the results of said adjustment of the one or more image parameters, and controls for storing one or more of the adjusted one or more image parameters, the original cell images, and the adjusted cell images, as well as the corresponding particle analysis data. In some embodiments, a history of adjustments to the one or more image parameters, original cell images, cell images resulting from said adjustments, and/or the corresponding particle analysis data is stored locally in, on, or associated with the particle analyzer 104 or stored in the data store 106.

The data store 106 may comprise one or more databases or data storage systems that store cell images, cell image adjustments, corresponding particle analysis data, and so forth, as described herein. For example, the data store 106 may comprise one or more cell images captured using the particle analyzer 104 prior to any adjustments. In some embodiments, such cell images stored in the data store 106 prior to adjustment may be associated with one or more cell image adjustments made or applied by the user device 102 and/or the particle analyzer 104 and any cell images resulting from the applied adjustments. In some embodiments, the data store 106 is an intelligent server device, and not just a storage device, and can monitor the user device 102 and the particle analyzer 104 for any cell image captures and/or adjustments.

In some embodiments, the network 110 comprises any wired or wireless communication network by which data and/or information may be communicated between multiple electronic and/or computing devices. The network 110 may connect nearby devices or systems together, employing widely used networking protocols. The various aspects described herein may apply to any communication standard, such as a wireless 802.11, Bluetooth, cellular, or similar protocols. Further to its description herein, the user device 102 may comprise any computing device configured to transmit and receive data and information via the network 110. The particle analyzer 104 may also comprise any computing device configured to transmit and receive data and information via the network 110. Similar to the user device 102, the entity device 104 may comprise a server, a laptop computer, a smart phone, a personal digital assistant, a tablet computer, or other computing device capable of connecting to the network 110. The user operating or controlling any of the user device 102 or the particle analyzer 104 may be an individual person, or an institution such as a business, a non-profit organization, an educational institution, and so forth.

Figure 2:
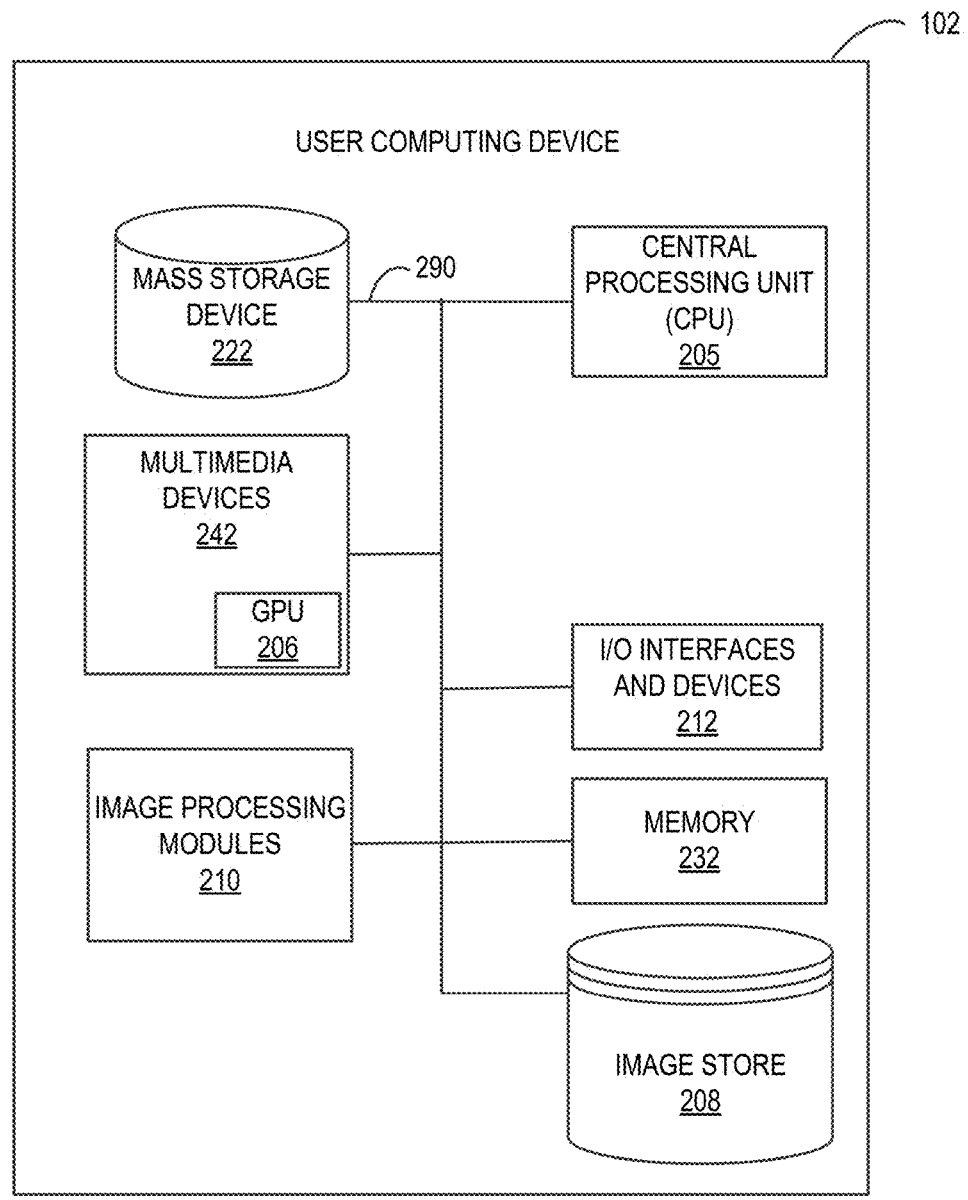
FIG. 2 is a block diagram showing example components of one of the computing devices depicted in the system of FIG. 1.

FIG. 2 is a block diagram showing example components of a user computing devices 102 as depicted in the system 100 of FIG. 1. The user device 102 may be, for example, a personal computer that is IBM, Macintosh, or Linux/Unix compatible or a server or workstation. In one embodiment, the user device 102 comprises a server, a laptop computer, a smart phone, a personal digital assistant, or a kiosk, for example. In one embodiment, the exemplary user device 102 includes one or more central processing units ("CPU") 205, which may each include a conventional or proprietary microprocessor. In some embodiments, the CPU 205 is configured to generate cell images from one or more data streams received from the particle analyzer 104 or the data store 106. In some embodiments, the CPU 205 processes cell images stored in the user device 102, obtained from the particle analyzer 104, and/or obtained from the data store 106 according adjustments made via a user interface. In some embodiments, the CPU 205 also processes the cell images for display on a monitor or other visual display device and processes the particle analysis data from the particle analyzer 104 or from the data store 106. Accordingly, the CPU 205 may enable the user device 102 to generate and/or manipulate cell images and display the generated and/or manipulated cell images alongside the particle analysis data.

The user device 102 further includes one or more memory 232, such as random access memory ("RAM") for temporary storage of information, one or more read only memory ("ROM") for permanent storage of information, and one or more mass storage device 222 or image store 208, such as a hard drive, diskette, solid state drive, or optical media storage device. In some embodiments, one or more of the data streams based on which the cell images are generated, the original cell images prior to adjustment, the adjusted cell images, and/or the adjustments to the cell images are stored in the mass storage device 222. The components of the user device 102 may be connected to each other using a bus system 290. In different embodiments, the bus system 290 could be implemented in Peripheral Component Interconnect ("PCP"), Microchannel, Small Computer System Interface ("SCSI"), Industrial Standard Architecture ("ISA") and Extended ISA ("EISA") architectures, for example. In addition, the functionality provided for in the components and modules of user device 102 may be combined into fewer components and modules or further separated into additional components and modules.

The user device 102 is generally controlled and coordinated by operating system software, such as Windows XP, Windows Vista, Windows 7, Windows 8, Windows Server, Unix, Linux, SunOS, Solaris, iOS, Blackberry OS, Android OS or other compatible operating systems (OSs). In Macintosh systems, the operating system may be any available operating system, such as MAC OS X. In other embodiments, the user device 102 is controlled by a proprietary operating system. Conventional operating systems control and schedule computer processes for execution, perform memory management, provide file system, networking, I/O services, and provide a user interface, such as a graphical user interface ("GUI"), among other things.

The user device 102 may include one or more input/output (I/O) devices and interfaces 212, such as a keyboard, a mouse, a touchpad, a monitor, a touchscreen, speakers, a microphone, and/or a printer. In one embodiment, the I/O devices and interfaces 212 include one or more display devices, such as the monitor or a projector, that allows the visual presentation of data to a user. More particularly, a display device provides for the presentation of GUIs, application software data, and multimedia presentations, for example. In some embodiments, the display device presents the cell images (for example, rendered by the CPU 205) and provides a user interface for making adjustments to the displayed cell images, as described in more detail with respect to FIG. 3. The display device may also provide the particle analysis data alongside the displayed cell images. In some embodiments, the I/O devices and interfaces 212 include any network interfaces, drive interfaces, input interfaces, or similar interfaces or inputs via which input image data (for example, via a data stream, and so forth) may be received, for example from the particle analyzer. In some embodiments, the I/O devices and interfaces 212 (or similar component) may receive the input data stream comprising a plurality of cell images and/or pixels. In some embodiments, the I/O devices and interfaces 212 (or similar component) may present an interface to a user and detect when the user changes one or more parameters using the interface.

The user device 102 may also comprise one or more multimedia devices 242, such as speakers, video cards, graphics accelerators, graphics processing units, and microphones, for example. As shown, the multimedia device 242 may also include a graphics processing unit (GPU) 206. The GPU 206 may be used by the user computing device 102 to rapidly process the graphics images provided by the particle analyzer 104. Thus, in some embodiments, the graphics or image processing is taken over by the GPU 206 instead of being performed on the CPU 205. In some embodiments, the GPU 206 and CPU 205 are programmed to share the image processing to provide a higher throughput than either could provide on their own. In some embodiments, the GPU 206 and/or the CPU 205 may be used together, or individually for processing the input data stream and/or for processing any pixels, image walls, cell images, and so forth as described herein. For example, in accordance with some embodiments, a fragment shader program may be implemented by a GPU 206, or by a CPU 205. Furthermore, the GPU 206 and/or the CPU 205 may perform rendering of cell images and pixels for display and/or render input components for display and user interaction. The rendering may apply to raw, processed, and/or modified cell images and/or pixels. In some embodiments, the CPU 205 implements a fragment shader program on a hardware pipeline of the GPU 206.

In the embodiment of FIG. 2, the I/O devices and interfaces 212 provide a communication interface to various external devices, for example via the network 110 to the particle analyzer 104 and/or the data store 106. In the embodiment of FIG. 2, the user device 102 is electronically coupled to the network 110, which comprises one or more of a LAN, WAN, and/or the Internet, for example, via a wired, wireless, or combination of wired and wireless, communication link. The networks communicate with various computing devices and/or other electronic devices via wired or wireless communication links.

In some embodiments, the I/O devices and interfaces 212 may generate data to one or more image processing modules 210 that comprise instructions for displaying a user interface (UI) to the user. The image processing modules 201 may be stand alone software instructions, or web browser plug in components, or other software instructions for displaying cell images and related data to the user. The UI, in addition to providing for control and monitoring of one or more of the cell images, the corresponding particle analysis data, and the particle analyzer 104, the UI may also enable the user to adjusting one or more parameters or aspects of the cell images, as described herein. In some embodiments, the UI may provide a dashboard from which the user can control various aspects of the user device 102, the particle analyzer 104, the cell images, and the corresponding particle analysis data. The dashboard may further provide for review of previously viewed cell images, previously made adjustments, and so forth.

Image Adjustment User Interface

As described herein, the UI may allow the user to make adjustments to one or more parameters of the cell image and change how the cell image is processed on the particle analyzer or within the user computing device. The UI may enable the user to display a cell image concurrently with available image adjustments values and within a millisecond-scale timeframe update the displayed cell image as different adjustments are made based on the available image adjustments. The instantaneous update of the displayed cell image may be the result of applying one or more algorithms described herein. As used herein "millisecond-scale timeframe" has its customary and ordinary meaning as understood in view of this disclosure. It refers to a timeframe that is about on the order of milliseconds, for example a timeframe that is less than 10, 9, 8, 7, 6, 5, 4, 3, 2, or 1 milliseconds. For example, as described herein, an operation performed within a millisecond-scale timeframe may be performed in less than 10, 9, 8, 7, 6, 5, 4, 3, 2, or 1 milliseconds.

Figure 3:
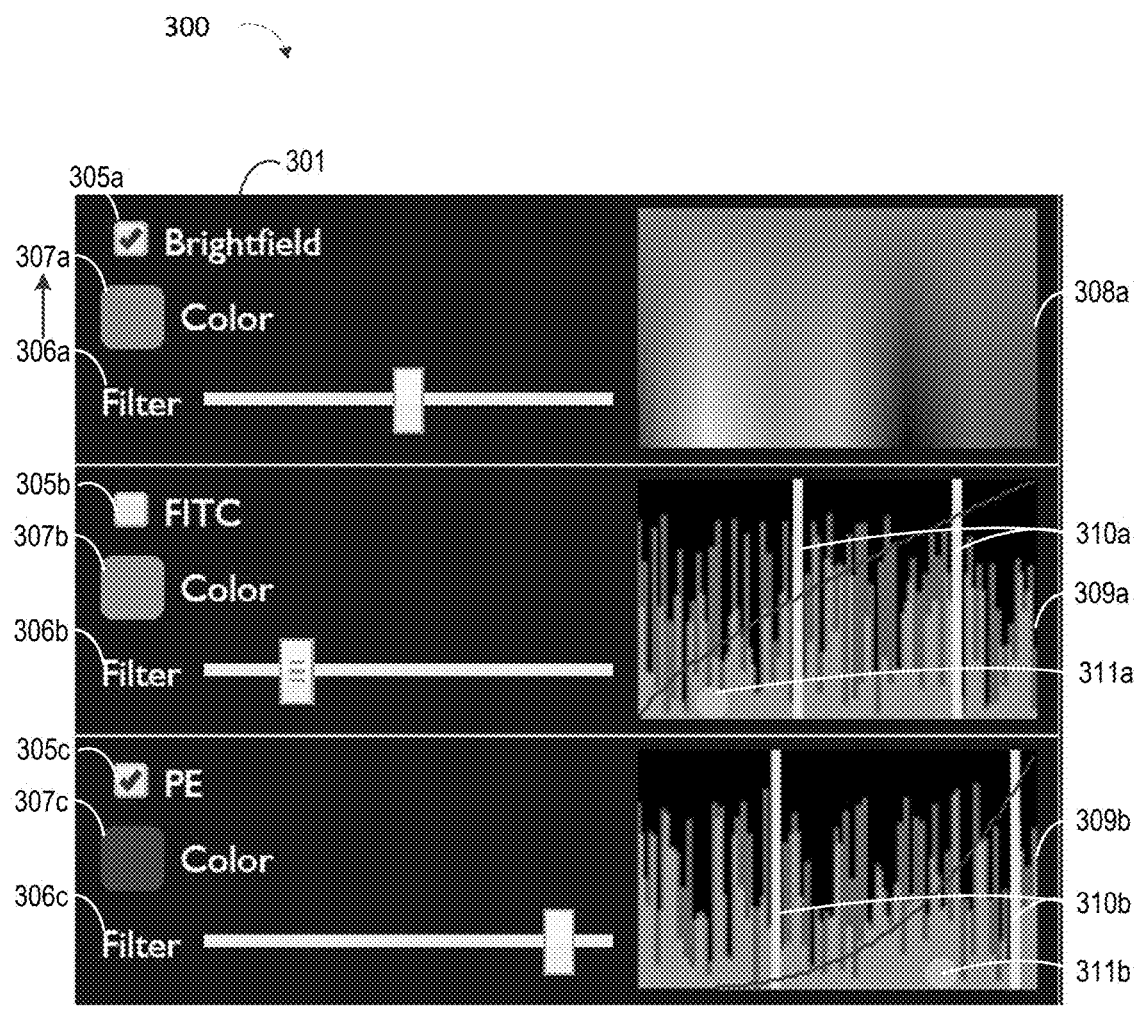
FIG. 3 is an exemplary image adjustment popup user interface (UI) displayed by a user computing device interfacing with cell images generated based on data streams from the particle analyzer of FIG. 1.

FIG. 3 is an exemplary image adjustment popup user interface (UI) 300 displayed by the user device 102 interfacing with cell images generated based on data streams from the particle analyzer 104 of FIG. 1. In some embodiments, the popup UI 300 provides the following user interface features via a control panel 301. The control panel 301 may include control elements for adjusting the cell images and any changes made using the control panel may be rapidly reflected in a wall of images (for example, 75, 80, or 150 images) as shown with reference to FIG. 4.

The control panel 301 allows the user to specify modifications to how the cell images are displayed. Such modifications may be computationally intensive and may generally be performed using a robust workstation. However, even on such a high powered computing device, the modifications and/or adjustments to each cell image may take minutes to complete per image in the wall of images since each cell image is subjected to intensive image processing. These adjustments include, but are not limited to:

Enabling/Disabling viewing one or more channel layers
Color Selection for the one or more channel layers—change the color of a particular channel
Convolution Filtering using mean and Gaussian filter kernels, supporting new kernels in the future such as edge detection
Thresholding—used to mask out noise at the lower intensities
Saturation—the upper end value for maximum brightness
Gamma adjustment—intensity of the darker and brighter areas
Gamma Curve—the curve showing the intensity curve
Display the intensity histogram—display of the image intensity samples In some embodiments, the adjustments may include additional adjustments, or may include a subset of any of the listed adjustments. For example, in some embodiments, the adjustments do not include one or more of the "Enabling/Disabling viewing," the "Color Selection," the "Convolution Filtering," the "Thresholding," the "Saturation," the "Gamma adjustment," the "Gamma Curve," or "displaying the intensity histogram." For example, in some embodiments, rather than displaying the intensity as a histogram, the intensity may be displayed in a different graphical and/or textual format.

In the popup UI 300, a subset of the adjustments listed herein (such as in the preceding paragraph and/or bullet list) are made available via the control panel 301. As shown, available adjustments include channel enable/disable channel toggle 305a for a Brightfield channel, a Brightfield channel filter slider adjustment bar 306a, a Brightfield channel color adjustment selector 307a, and a Brightfield channel adjustment selection panel 308a. The enable/disable channel toggle 305a for a Brightfield channel may enable or disable the display of the Brightfield channel. The Brightfield channel filter slider adjustment bar 306a may allow for an adjustment of the channel filter applied to the Brightfield channel, thereby allowing selection or application of a number of smoothing filters to the Brightfield channel image. The Brightfield channel color adjustment selector 307a may toggle display of the Brightfield channel color adjustment panel 308a and may display the selected color from the Brightfield channel color adjustment panel 308a. The Brightfield channel color adjustment panel 308a shows the available colors that can be selected for the Brightfield channel. Similarly, the available adjustments include channel enable/disable channel toggle 305b for a FITC channel, an FITC channel filter slider adjustment bar 306b, an FITC channel color adjustment selector 307b, and an FITC channel histogram 309a. The enable/disable channel toggle 305b for the FITC channel may enable or disable the display of the FITC channel. The FITC channel filter slider adjustment bar 306b may allow for an adjustment of the channel filter applied to the FITC channel, thereby allowing selection or application of a number of smoothing filters to the FITC channel image. The FITC channel color adjustment selector 307b may toggle display of the FITC channel color adjustment panel (not shown in this figure) or the FITC channel histogram 309a and may display the selected color from the FITC channel color adjustment panel. The FITC channel histogram 309a may show a representation of FITC channel image samples collected and may enable the user to see the distribution on intensities of the FITC channel image samples and to adjust the image settings accordingly, for example using one or more threshold bars 310a or a gamma selection 311a.

Additionally, the available adjustments may include channel enable/disable channel toggle 305c for a PE channel, a PE channel filter slider adjustment bar 306c, a PE channel color adjustment selector 307c, and a PE channel histogram 309b. The enable/disable channel toggle 305c for the PE channel may enable or disable the display of the PE channel. The PE channel filter slider adjustment bar 306c may allow for an adjustment of the channel filter applied to the PE channel, thereby allowing selection or application of a number of smoothing filters to the PE channel image. The PE channel color adjustment selector 307c may toggle display of the PE channel color adjustment panel (not shown in this figure) or the PE channel histogram 309b and may display the selected color from the PE channel color adjustment panel. The PE channel histogram 309b may show a representation of PE channel image samples collected and may enable the user to see the distribution on intensities of the PE channel image samples and to adjust the image settings accordingly, for example using one or more threshold bars 310b or a gamma selection 311b. In some embodiments, the PE channel histogram 309b provides for an adjustment of gamma 311b, which adjusts the intensity of the PE channel image and shows a threshold 310b that reduces noise in the PE channel image. Furthermore, the FITC and PE channel histograms 309 shows a saturation of the respective channel image samples. While FITC and PE channels are used by way of example, it will be appreciated that any suitable channels for cell imaging may be used in accordance with methods and apparatuses as described herein, for example Alexa405, DAPI, Hoescht 33258, Alexa488, FITC, green fluorescent protein (GFP), yellow fluorescent protein (YFP), cyan fluorescent protein (CFP), Alexa568, Cy3, PI, Alexa594, rhodamine, Texas red, Alexa633, and/or Cy5.

In some embodiments, the control panel 301 may be presented as the popup UI 300. In some embodiments, the control panel 301 may be small and efficiently present the adjustment options available to the user for modifying the image settings. In some embodiments, the control panel 301 is interactive and provides visual cues regarding the behaviors or effects of the available adjustments. In some implementations, the control panel 301 may be accessed in a network or Internet browser, a custom application for viewing, or some other light weight client application. Accordingly, the control panel 301 may operate on a wide range of computing devices, even those with constrained resources (for example, low power processing systems) rather than requiring the robust workstation identified herein for viewing, analyzing, and modifying the cell images.

Image Processing Processes and Performance

Controlling the adjustments using the popup UI 300 is just one aspect of the apparatuses, systems, and methods of some embodiments herein. In some embodiments, the apparatus, system, and/or method comprises performing the adjustments in real time (for example, within a millisecond-scale timeframe). The adjustments can be performed with sufficient efficiency without requesting confirmation from the user. For example, when the user uses the popup UI 300 and the control panel 301 to make adjustments to the cell images in the image wall, no confirmation (for example, selection by the user of an "OK" or "Cancel" button) may be necessary before the adjustments are made to the incoming stream of cell images and displayed as part of the image wall.

For example, as a user interacts with one of the filter slider adjustment bars 306*a-c* to adjust a corresponding image parameter, the wall of images are updated based on the current value of a slider of the corresponding filter slider adjustment bar 306*a-c* as the slider is moved. Since a non-stationary input device (such as a mouse or a touchscreen) may be used to adjust many of the image parameters, the immediate update of the wall of images based on the current value of the adjusted image parameters may translate into many visual updates of the wall of images per second. Accordingly, the wall of images may be modified and refreshed on the display or monitor within a millisecond-scale timeframe of the user making changes via the control panel 301. Such updates implement efficient image processing algorithms described herein.

Figure 4C:
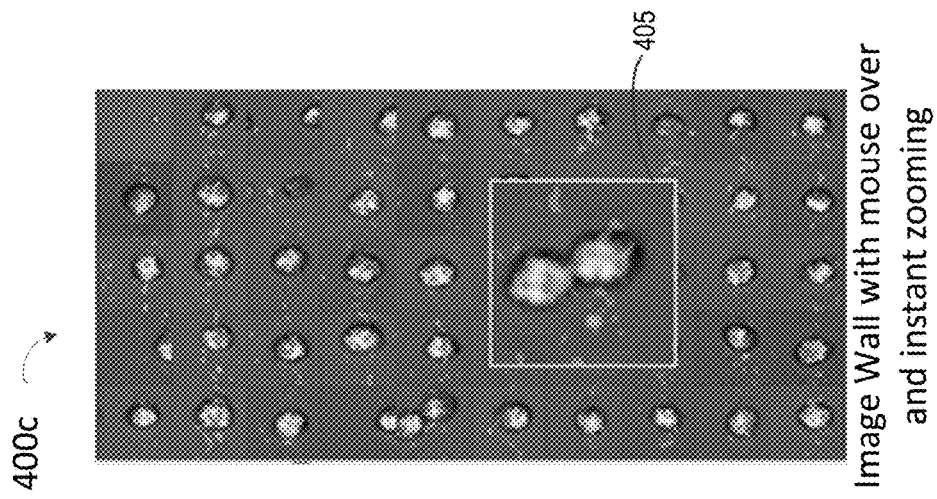
FIGS. 4A-4C are exemplary views of an image wall of various cell images acquired by the particle analyzer and as viewed on a user computing device, with various levels of manipulation applied thereto.
Figure 4B:
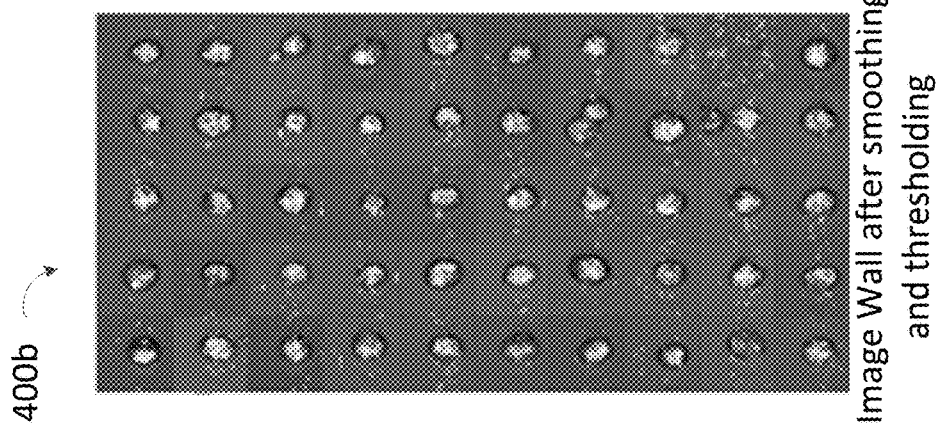
Figure 4A:
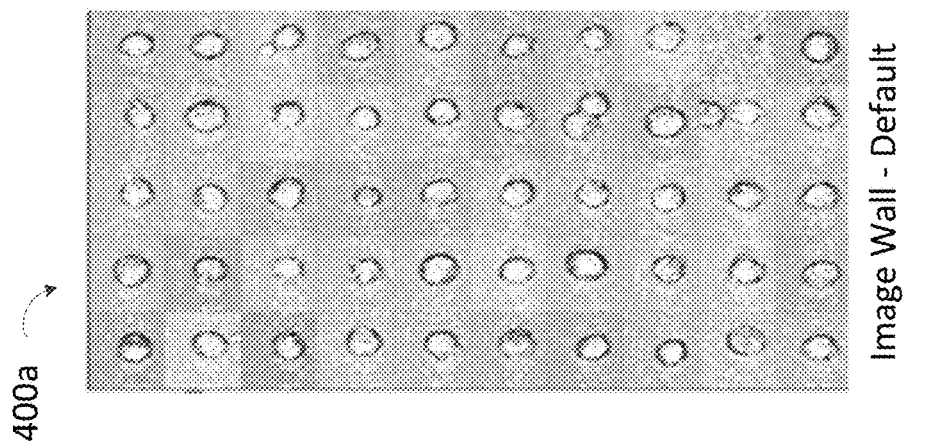

FIGS. 4A-4C are exemplary views of a set of image walls 400*a-c* depicting fifty (50) cell images acquired by the particle analyzer 104 and as viewed on the user device 102, with various levels of manipulation and adjustment applied thereto. The image walls 400*a-c* may display multiple cell images to the user. In some embodiments, the image walls 400*a-c* are displayed on the user device 102 or other monitor or display device with the popup UI 300. In some embodiments, the image walls 400*a-c* alongside, above, below, behind, etc. the popup UI 300. In some embodiments, the number of cell images shown in the image wall may be between fifty (50) and one hundred (100) images.

FIGS. 4A-4C show example screen images of the image walls 400*a-c* in various stages of adjustment and/or modification. For example, FIG. 4A shows the image wall 400*a* in a "raw" format without any adjustment(s) applied to any of the cell images gathered from the particle analyzer. FIG. 4B shows the image wall 400*b* after one or more smoothing filters and one or more thresholding algorithms were applied to the raw image 400*a*. FIG. 4C shows an image wall 400*c* after a user interaction with a specific cell image 405 of the image wall 400*b*, specifically with a zooming in on one of the cell images of the image wall 400*b*. As shown, the image wall 400*c* shows an expanded and enlarged region of the specific cell image 405 that was selected by the user.

Each image shown on the image walls 400*a-c* may comprise about 10,000 pixels and have a data storage size of approximately 250 kilobytes (kB). Accordingly, the memory 232 or the memory of any device performing the image adjustments (for example, the memory of the particle analyzer 104 or the user device 102) may utilize between 12 megabytes (MB) and 25 MB for the image wall of between 50 and 100 images. It will be appreciated, however, that depending on the particular cell imaging information and resolution requirements of the task, the cell image may comprise a different pixel quantity and/or data storage size, for example, at least 5,000, 10,000, 20,000, 50,000, or 100,000 pixels, and/or a data storage size of at least 250 kB, 500 kB, 750 kB, 1 megabyte (MB), 2 MB, 3 MB, 4 MB, or 5 MB. The image processing algorithms that perform the adjustments selected by the user via the popup UI 300 described herein with reference to FIG. 3 may apply the selected adjustments on each cell image of the image wall 400*a* at the pixel level. Such application may be time-consuming, effectively having to process and apply the selected adjustments to between 500,000 and 10,000,000 pixels in real-time as the image parameters are dynamically updated.

For example, for the image wall 400*a*, approximately 500,000 pixels may need adjustment, where each pixel may be rendered based on multiple channels of information (by way of example, up to eight channels are depicted in FIGS. 3, 4A-C, and, 5, though it will be appreciated that a larger or smaller number of channels may be used for a particular imaging task). Thus, in adjusting and rendering the cell images for the image wall 400*a*, the device performing the processing of the cell images (for example, the user device 102 or the particle analyzer 104) may process each of the 500,000 pixels of the image wall 400*a* eight times. In some embodiments, the adjustments and/or other image processing settings may differ for each of the multiple (e.g., eight) channels. For example, one or more of the eight adjustments may be applied to each of the eight channels for each pixel of the image wall 400*a*.

For example, as shown in FIG. 3, the Brightfield channel (for example, a first channel) of a first pixel of a first cell image of the image wall 400 may have the Brightfield channel color adjustment selector 307*a* that is set to "green" while the FITC channel (for example, a second channel) of the first pixel of the first cell image of the image wall 400*a* may have the FITC channel color adjustment selector 307*b* set to "yellow". Such a diverse and large range of possibilities for the pixel adjustment may further increase the complexities involved in the processing of the image wall 400*a* to account for user adjustments made via the popup UI 300 or similar interface. As an example of the computational processing that may be needed, a single algorithmic step of a single filtering operation on the image wall 400*a* with all channels enabled can easily exceed 450 million multiply and add instructions. As noted herein, even with such a processing demand, the systems and methods herein provide for the adjustment, processing, rendering, and display of the cell images of the image wall 400*a* in real time.

In some embodiments, the device performing the image processing corresponding to the adjustments and/or modifications (for example, the user device 102 or the particle analyzer 104) may utilize a plug-in component that aids in improving efficiencies and speeds of the cell image processing of the image wall 400*a*. In some embodiments, the plug-in component may be integrated directly into one or more of the popup UI 300, the control panel 301, the CPU 205 of the device, the multimedia device(s) 242 of the device, and so forth. For example, the plug-in component may comprise a WebG12 plug-in component or similar plug-in component that executes a portion or all of the image processing algorithms in the graphics processing unit (GPU) of the device presenting the cell images and the image wall (for example, the user device 102). Thus, the plug-in component may perform some or all of the processing required to adjust or modify the cell images of the image wall based on the selections made by the user on the control panel 301 of the popup UI 300.

In some embodiments, the plug-in component may comply with the WebGL 2.0 Specification by the Khronos Group, which is accessible on the world wide web at www dot khronos dot org forward slash registry forward slash webgl forward slash specs forward slash latest forward slash 2.0. The WebGL 2.0 Specification by the Khronos Group is incorporated by reference in its entirety herein. This and similar technology may allow the CPU 205 or GPU 206 of the device displaying the cell images and the image wall 400a to execute their image analysis processes in parallel for each pixel. In some embodiments, the drawing and computational features described herein may also be implemented by the CPU 205 using a shading language, such as OpenGL Shading Language (GLSL). The shading language may allow the CPU 205 or GPU 206 to implement all the drawing and algorithms using parallel vector operations. Thus, the algorithms used to process the cell images of the image wall 400a based on the user selected parameters received via the control panel 301 may be implemented in one or more shading languages.

As described herein, the image wall 400a may present the modified cell images concurrently and instantly (for example, within a millisecond-scale timeframe) with any changes made by the user regarding the image parameters via the control panel 301. Thus, when the user initially looks at the cell images received from the particle analyzer 104 or the data store 106, the device (for example, the user device 102) may display the image wall 400a as shown in FIG. 4A as raw images without any adjustments or modifications applied to any of the cell images of the image wall 400a. Using the algorithms and processing described herein, as the user adjusts one or more image channel parameters via the control panel 301 of the popup UI 300, the user device 102 (for example, via one or more of the CPU 205 and the multimedia device(s) 242) may process the cell images of the image wall 400a. Such processing of the image wall 400a and the pixels and cell images therein may result in the image wall 400b shown in FIG. 4B being displayed to the user while the user is adjusting the one or more image channel parameters. In some embodiments, the user may select a particular cell image from the image wall 400b or move the mouse or other selecting device. When the cursor (for example mouse or trackpad cursor, or a contact with a touchscreen) hovers above one of the cell images of the image wall 400b, the corresponding cell image may be enlarged without further click or selection. In some embodiments, when the user selects one of the cell images of the image wall 400b, the corresponding cell image may be enlarged. An example of the enlarged cell image 405 is shown in FIG. 4C.

In some embodiments, the enlarged view of the cell image as shown in FIG. 4C may provide a highly detailed view of the cell image. In some embodiments, additional information can also be displayed along with the enlarged cell image. For example, when the particular cell image of interest is enlarged, particle analysis information for that cell image may be displayed for the user concurrently. For example, the particle analysis information associated with the enlarged cell image may be highlighted in plots showing event data from flow cytometry, such as a dotplot for the enlarged cell image. By way of example, the particle analysis data may show one or more different parameters measured by flow cytometry such as the level of a marker or a dye, or qualitatively whether a particular cell is determined to be positive or negative for one or more markers based on flow cytometry analysis. For example, flow cytometry data indicating that a cell is a $CD14^+$ macrophage may be displayed alongside microscopy image data showing phagocytosis of pathogens. In some embodiments, the particle analysis data comprises a cell phenotype. The cell phenotype can be ascertained from the one or more different parameters measured by flow cytometry.

Each cell image of the image wall 400a-c may be associated with a unique identifier that may be used to determine which scanning event by the particle analyzer 104 is associated with a given cell image. In some embodiments, the device displaying the image walls 400a-c (for example, the user device 102) may also display any group of cell images in the image walls 400a-c. For example, the image wall 400a may allow for the user to group and view cell images by: (1) order in the file (for example, as collected by an apparatus comprising a flow cytometer and laser scanning microscope as described herein); (2) population grouping such as populations identified using a gate; or (3) other metadata tagging.

It will be appreciated that UI's as described herein (e.g., the popup UI 300) can be used in conjunction with the collection of components 500 as described herein in methods and apparatuses of some embodiments.

Creation and Processing of the Image from the Stream Data

As described herein, the particle analyzer 104 may generate and transmit an image data stream corresponding to cells processed and/or analyzed by the particle analyzer 104. For example, a laser scanning microscope may generate and transmit the input image data stream including multiple images captured by the laser scanning microscope. For example, the particle analyzer may comprise a flow cytometer. In some embodiments, the image data stream includes an identifier for each cell (for example, corresponding to a scanning event). The identifier for each cell may then be used by the device displaying and/or adjusting cell images (for example, the user device 102 or the particle analyzer 104) to correlate the cell image with other particle measurement data or information for the cell scanned at the scanning event when the corresponding cell image was captured.

As described herein with reference to cell image pixels, each image in the image data stream may include two or more channels of data, which may include, for example different ranges of fluorescence emission wavelengths, and/or different Raman scattering spectra. For example, each image may comprise up to 2, 4, 6, 8, 10, 12, 14, 16, 18, or 20 channels of data, which may each be represented using a different color and/or pattern. In some embodiment, the image comprises eight channels of data that are represented using a different color. In some embodiments, these channels are composited or combined to form the cell image for display and adjustment after initial processing. The initial processing steps that may be applied to any channel in the image data stream include:

Filtering
Thresholding
Saturation
Gamma Correction

The processing may be performed on multiple pixels in parallel. In some embodiments, the filtering is performed first. Following the filtering, the thresholding, saturation, and gamma correction can be performed in any order. By way of example, the filtering can comprise a convolution operation such as smoothing.

FIG. 5 shows a functional block diagram of a collection 500 of components for displaying and manipulating images as viewed by the user device 102 of FIG. 1 or other viewing device. The components shown in the collection 500 may be implemented in hardware, such as an application specific integrated circuit (ASIC). In some embodiments, the components shown in the collection 500 may be implemented in software. For example, the software may comprise specific computer executable instructions that can be executed by one or more processors or CPUs 205 or GPUs 206 to cause a corresponding device (for example, the user device 102 or the particle analyzer 104 or any other device configured to process a data stream generated and transmitted by the particle analyzer 104) to perform one or more of the functions described. In some embodiments, the collection 500 of components comprises an example configuration of components that may create the images for a cell image received in an image data stream from the particle analyzer 104. In some embodiments, the images comprise radio frequency multiplexed cell images, for example, fluorescence and/or Raman spectroscopy cell images, which can be obtained, for example, by laser microscopy. In some embodiments, the images comprise FIRE images. Accordingly, the image data stream can comprise a FIRE image data stream. It will be appreciated that the collection of components 500 as described herein can be used in conjunction with UI's (e.g., the popup UI 300) as described herein in methods and apparatuses of some embodiments.

The collection 500 of components includes a fragment shader program 502, a processing engine 504, a display output 506, a memory for storage of image creation parameters or a UI 508 from which the image creation parameters are received, a filter kernel 510, and an input image data stream 512 (for example, radio frequency multiplexed cell images comprising two or more channels, such as the FIRE image data stream from the laser scanning microscope described herein). In some embodiments, the input image data stream 512 may be image data from one or more other means for or methods of obtaining image data (for example, Raman spectroscopy). The fragment shader program 502 may be configured to implement one or more drawing and computational features using the shading language, as described herein. In some embodiments, the fragment shader program 502 may comprise a software component for application to the CPU 205, the graphics processing unit (GPU) that is part of the multimedia device(s) 242 or a standalone GPU (not shown herein). For example, the fragment shader 502 (for example, a fragment shader program, module, or component) may comprise one or more programs that configure the CPU 205 or the GPU (for example, via a hardware pipeline of the CPU 205 or the GPU) for processing the input data stream to generate the cell image and/or the pixel. In some embodiments, the one or more programs of the fragment shader may configured the hardware pipeline of the CPU 205 or the GPU for parallel processing of the input data stream. Accordingly, in some implementations, the fragment shader program 502 may be implemented as a shader program for use with other hardware or as a standalone shader circuit. Accordingly, the fragment shader program 502 may process the input image data stream 512 as received from one or more of the particle analyzer 104 or the data store 106 to generate the pixel associated with the processed information from the input image data stream 512. In any of the embodiments described herein, the fragment shader program 502 may process multiple algorithms for each pixel (for example, processing of multiple channels) of the input image data stream 512 in parallel. In any of the embodiments described herein, the fragment shader program 502 may store processed data (for example, data from one or more channels) in a data buffer or similar storage instead of directly outputting to a display.

The processing engine 504 may comprise one or more of the CPU 205 or the GPU 206 of the multimedia device(s) 242 described herein with reference to FIG. 2. In some embodiments, the processing engine 504 may take pixels generated by the fragment shader program 502 and assemble the generated pixels into cell images for display by the display output 506 (for example, as part of the image wall 400). Accordingly, a processed cell image can be produced. In some embodiments, the display output 506 may comprise the monitor or display described herein with reference to I/O interfaces and devices 212. In some embodiments, the display output 506 may comprise a memory (for example, the mass storage device 222 or the image store 208 or the data store 106) for storage of the generated cell image. In some embodiments, the memory for storage of image creation parameters or a UI 508 from which the image creation parameters are received may comprise a source for variables, etc., used to control the fragment shader program 502. For example, the memory or UI 508 may provide the variables that control execution of the fragment shader with respect to saturation, thresholds, color, and so forth when processing the input image data stream 112 and generating the cell images (which can comprise one or more pixels). In some embodiments, the filter kernel 510 may be implemented by a processor (for example, the GPU 206 of the user device 102 or the particle analyzer 104). The filter kernel 510 may be used in a convolution operation, for example smoothing. The kernel used in the filter kernel 510 may comprise or consist of a texture that has been loaded for application to or on a particular channel, for example an FITC or PE channel. In some embodiments, the filter kernel 510 may perform convolution filtering using one or more of mean and Gaussian filter kernels, while having an ability to support additional and/or newly developed kernels, such as edge detection. Thus, in some embodiments, the filter kernel 510 may filter each pixel in each cell image (for example, raw cell images received from the input data stream). Once the filter kernel 510 filters each pixel, the filtered pixel may be further processed by the CPU 205 and/or the GPU, such as at least one of thresholding, saturation, or gamma correction, to produce a processed pixel value for the pixel, which may be used to generate the processed cell images. In some embodiments, filter kernel 510 is applied by the CPU 205 and/or the GPU.

Figure 6:
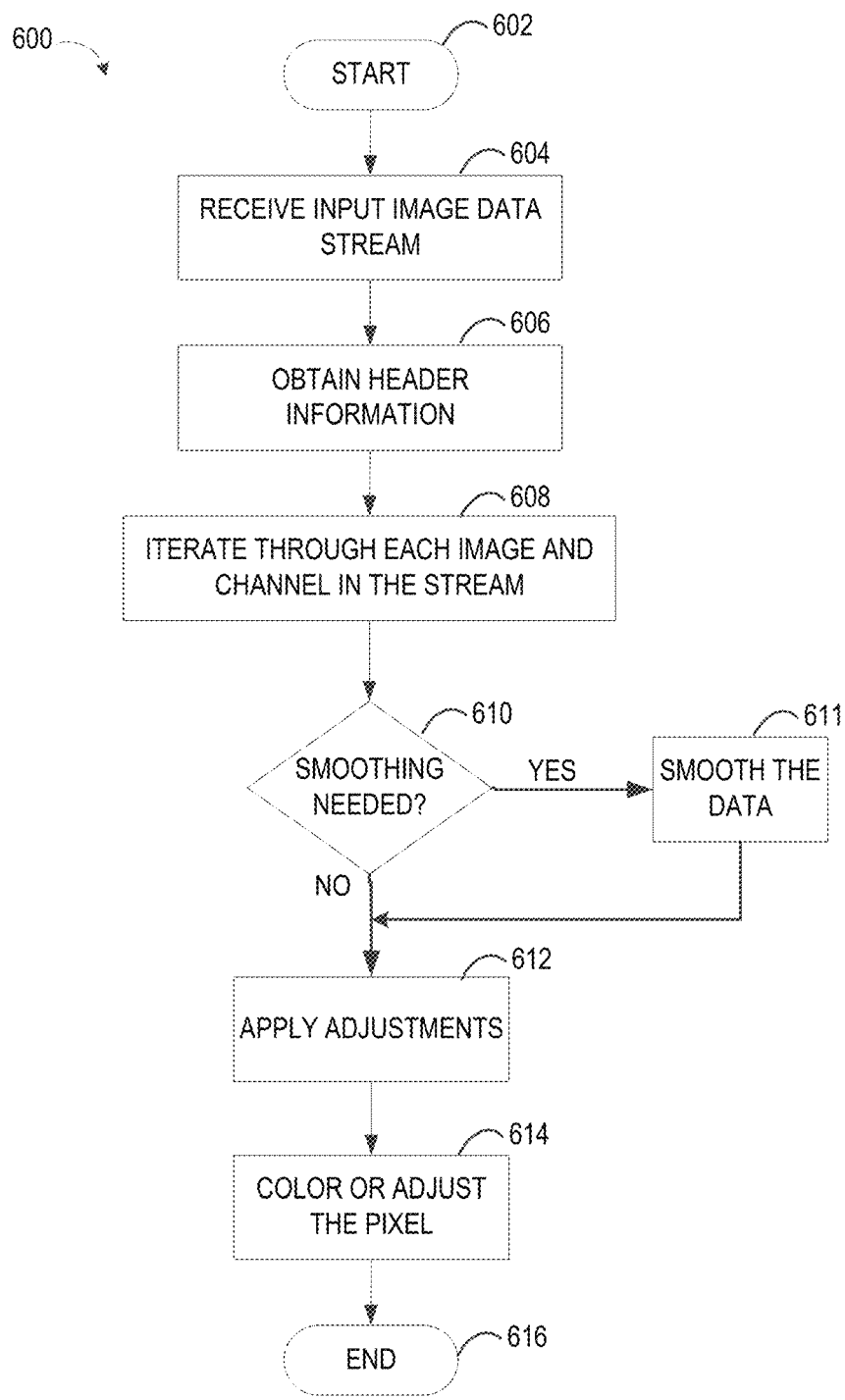
FIG. 6 shows a flow diagram of generating a pixel of a cell images based on an input data stream for display on a user computing device of FIG. 1.

FIG. 6 shows a flow diagram of a method 600 for generating a pixel of a cell image based on an input data stream for display on the user device 102 of FIG. 1. In some embodiments, the method 600 may be implemented by one or more of the devices shown or described herein (for example, the user device 102 or the particle analyzer 104). In some embodiments, the method 600 may include more or fewer steps than shown in FIG. 6.

The method 600 begins at block 602 and includes, at block 604, receiving the input image data stream 512 from the imaging system of the particle analyzer. In some embodiments, the input image data stream 512 may comprise radio frequency multiplexed cell image data (for example, FIRE image data) and/or may be received via one or more communication networks (for example, network 110). In some embodiments, the input image data stream 512 may be received by the CPU 205 or the GPU 206 of the multimedia device(s) 242 of the user device 102 or the particle analyzer 104. Once the input image data stream 512 is received (for example, via a browser or similar application or software module), the method 600 reads header information from the input image data stream 112 at block 606.

Reading header information may comprise obtaining or determining a number of images included in the input image data stream 512, obtaining or determining one or more dimensions of the image(s) (for example, an x-y coordinate of each pixel) included in the input image data stream 512, and a number of channels included for each of the images in the input image data stream 512 and/or for the input image data stream 512 itself, among other information. In some embodiments, this header information may be obtained or determined by one or more of the CPU 205, the GPU, or the I/O interfaces and devices 212 (for example, the communication interface) of the user device 102 or other device displaying the images based on the information from the particle analyzer 104 or the data store 106. The header information may be stored in the memory 232 for use during one or more operations.

Once the process 600 has read the header information, the method 600 further includes iterating through each image in the input image data stream 512 and iterating through each channel in the input image data stream 512 at block 608. In some embodiments, the iterations may be performed by the CPU 205 or the GPU 206 of the multimedia device(s) 242 of the user device 102 or the particle analyzer 104. Once the process 600 has iterated through each image and channel in the data stream, the method 600 determines, at decision block 610, if there is smoothing to be applied to data of one or more images or channels and pixel information. If the determination identifies that smoothing is to be applied, then the process 600 moves to a block 611 and smoothing is applied to the information and/or data. If smoothing is not determined to be applied at the decision block 610, then no smoothing is applied and process 600 moves to a block 612. In some embodiments, the determination and/or the smoothing of data may be received by the CPU 205 or the GPU of the multimedia device(s) 242 of the user device 102 or the particle analyzer 104.

At the block 612, the method 600 includes applying threshold, saturation, and gamma correction adjustments and then the process 600 moves to coloring or adjusting the pixel at block 614. In some embodiments, the application of threshold, saturation, and gamma correction adjustments and the coloring of the pixel location may be performed by the CPU 205 or the GPU 206 of the multimedia device(s) 242 of the user device 102 or the particle analyzer 104. The method 600 then terminates at a block 616.

In some embodiments, for each channel associated with an image in the input image data stream 512, an adjustment pipeline (for example, part of the CPU 205 or the GPU) may process the pixel data for the channel. One example adjustment pipeline includes:

Filter
Threshold
Saturate
Gamma Correct

In some embodiments, the adjustment pipeline comprises filter, threshold, saturate, gamma correct, or two or more of the listed items, for example, filter and threshold, filter and saturate, filter and gamma correct, threshold and saturate, threshold and gamma correct, filter and threshold and saturate, filter and threshold and gamma correct, filter and saturate and gamma correct, or threshold and saturate and gamma correct.

As each channel is processed, the resulting pixel information may be blended (for example, by the CPU 205 or the GPU 206) to generate a processed pixel value for the location of the pixel in a pixel map of the cell image. The blending may include averaging the channel values. The blending may include a weighted average which associates different weights with different channels. The weights may be configured or selected using the control panel 301 or through another configuration means. In some embodiments, the configuration may be particular to a user and associated with a user profile that is loaded prior to or as part of the process 600. In some implementations, the configuration may be a general setting which is applied to all or various users that view images from the input image data stream 512 of the particle analyzer 104.

Having rendered an initial view of the input image data stream 512, features may also be included to expedite applying adjustments to the cell images. To obtain fast (for example, millisecond-scale timeframe) response times, the client application (for example, the browser, and so forth) may execute instructions using a hardware pipeline within aGPU. Instructions may provide for parallel computation of the pixel values. While general purpose CPUs may not be well suited to the parallel image computations, the GPU may include specially architected processing elements to efficiently execute the image processing according to the described algorithms. As noted herein, some exemplary programs that provide corresponding instructions and configure the GPU may be referred to as shaders. In some implementations, the features described may be implemented as a shader program.

In some embodiments, the image data being processed form the input image data stream 512 may be uploaded to the GPU as a data texture so that it can be accessed by the shaders. When each pixel is processed by the shader, the shader may access the texture. In some embodiments, an x/y location of the pixel determines a location in the texture value that is used for shading that pixel. This value may then be processed using the various algorithms implemented in the shader.

In some implementations, the first operation performed on a pixel generated based on the input image data stream 512 is the filter kernel. The filter kernel may be used in a convolution operation such as smoothing. The kernel itself may be a texture that has been loaded for a particular channel. After the smoothing is completed, the operations for thresholding, saturation, and gamma correction may be initiated.

Additional Embodiments

As used herein, "system," "instrument," "apparatus," and "device" generally encompass both the hardware (for example, mechanical and electronic) and, in some implementations, associated software (for example, specialized computer programs for graphics control) components.

As used herein, an "event" generally refers to the data measured from a single particle, such as cells or synthetic particles. Typically, the data measured from a single particle include a number of parameters, including one or more light scattering parameters, and at least one fluorescence intensity parameters. Thus, each event is represented as a vector of parameter measurements, wherein each measured parameter corresponds to one dimension of the data space. In some biological applications, event data may correspond to quantitative biological data indicating expression of a particular protein or gene.

As used herein, a "population", or "subpopulation" of particles, such as cells or other particles, generally refers to a group of particles that possess optical properties with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, for example, with respect to a subset of the measured parameters, which corresponds to populations that differ in only a subset of the measured parameters.

As used herein, a "gate" generally refers to a boundary identifying a subset of data (for example, particle measurements) of interest. In cytometry, a gate may bound a group of events of particular interest. The group of events may be referred to a population. Further, as used herein, "gating" may generally refer to the process of defining a gate for a given set of data such as via a user interface or plate and well selections.

The various embodiments of interactive and dynamic safe zone generation and control of the present disclosure are the result of significant research, development, improvement, iteration, and testing. This non-trivial development has resulted in the methods and processes described herein, which may provide significant efficiencies and advantages over previous systems. The interactive and dynamic user interfaces include efficient human-computer and computer-computer interactions that may provide reduced workloads, accurate predictive analysis, and/or the like, for a user. For example, access to user information for entities may be automated such that the user is not prompted to provide authentication information when the user is in a safe zone, thereby enabling a user to more quickly access, navigate, participate in, and conclude a transaction (such as image processing) than conventional systems.

Further, the data processing and interactive and dynamic user interfaces described herein are enabled by innovations in efficient data processing and interactions between the user interfaces and underlying systems and components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein a "data storage system" may be embodied in computing system that utilizes hard disk drives, solid state memories and/or any other type of non-transitory computer-readable storage medium accessible to or by a device such as an access device, server, or other computing device described. A data storage system may also or alternatively be distributed or partitioned across multiple local and/or remote storage devices as is known in the art without departing from the scope of the present disclosure. In yet other embodiments, a data storage system may include or be embodied in a data storage web service.

As used herein, the terms "determine" or "determining" encompass a wide variety of actions. For example, "determining" may include calculating, computing, processing, deriving, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (for example, send or receive data) in accordance with one or more of the aspects described.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. An apparatus for displaying radio frequency multiplexed cell images, the apparatus comprising:
    an input interface configured to receive an input data stream from a particle analyzer, wherein the input data stream comprises raw cell images, wherein each raw cell image comprises a plurality of pixels and at least two or more data channels corresponding to each pixel in the raw cell image;
    a processor configured to:
        generate an image wall comprising a plurality of the raw cell images, and
        generate a control panel to enable a user to change one or more parameters to modify one or more of the raw cell images of the image wall; and
    a display device configured to display one or more objects rendered for display on the display device,
    wherein the processor is further configured to:
        render the image wall and the control panel for simultaneous display on the display device,
        identify one or more parameters changed by the user via the control panel while the user is changing the one or more parameters,
        modify each of the raw cell images of the image wall according to the one or more identified parameters changed by the user within a millisecond-scale interval of the user changing the one or more parameters, and
        render the modified cell images of the image wall for display on the display device,
    wherein the display device is further configured to display the modified cell images of the image wall as the user is making changes to the one or more parameters.

2. The apparatus of claim 1, wherein the millisecond-scale interval comprises an interval of 10 milliseconds or less.

3. The apparatus of claim 1, the processor comprising a hardware pipeline.

4. The apparatus of claim 3, wherein the processor is configured to implement a fragment shader program on the hardware pipeline, the fragment shader program comprising one or more programs that configure the hardware pipeline for parallel processing of two of more channels of a pixel of the input data stream to generate a processed pixel or a cell image,
    wherein said processor comprises a filter kernel configured to filter each pixel in each raw cell image; and
    wherein said processor is configured to perform at least one of thresholding, saturation, or gamma correction to produce a processed pixel value for the pixel.

5. The apparatus of claim 3, wherein the processor comprises a graphics processing unit (GPU) comprising the hardware pipeline,
    wherein the GPU is configured to implement the fragment shader program.

6. The apparatus of claim 3, the processer comprising:
    a graphics processing unit (GPU) comprising the hardware pipeline; and
    a central processing unit (CPU) configured to implement the fragment shader program.

7. The apparatus of claim 1, wherein the input data stream comprises data obtained from fluorescence imaging, Raman spectroscopy, or a combination thereof.

8. The apparatus of claim 1, wherein the cell images comprise fluorescence imaging using radio frequency multiplexed excitation (FIRE) images.

9. A method of displaying radio frequency multiplexed cell images, the method comprising:
    receiving an input data stream sourced from a particle analyzer, the input data stream comprising a plurality of raw cell images, wherein each raw cell image comprises a plurality of pixels and at least two or more data channels corresponding to each pixel in the raw cell image;
    generating an image wall comprising the plurality of raw cell images;
    generating a control panel to enable a user to change one or more parameters to modify one or more of the raw cell images of the image wall;
    rendering the image wall and the control panel for simultaneous display on the display device;
    identifying one or more parameters changed by the user via the control panel while the user is changing the one or more parameters;
    modifying each of the raw cell images of the image wall according to the one or more identified parameters changed by the user within a millisecond-scale interval of the user changing the one or more parameters;

rendering the modified cell images of the image wall for display on the display device; and displaying the modified cell images of the image wall as the user is making changes to the one or more parameters.

10. The method of claim 9, wherein the millisecond-scale interval comprises an interval of 10 milliseconds or less.

11. The method of claim 9, wherein the input data stream comprises data obtained from fluorescence imaging, Raman spectroscopy, or a combination thereof.

12. The method of claim 11, wherein the raw cell images comprise fluorescence imaging using radio frequency multiplexed excitation (FIRE) images.

13. The method of claim 11, wherein the raw cell images comprise Raman spectroscopy imaging images.

14. The method of claim 13, further comprising displaying cytometry data in addition to the modified cell images, wherein the cytometry data comprises single cell data corresponding one-to-one to the cells of the modified cell images.

15. The method of claim 13, further comprising displaying cytometry data in addition to the modified cell images, wherein the cytometry data comprises data for a population of cells.

16. The apparatus of claim 4, wherein the filter kernel:
comprises a texture for application to a channel of the two or more data channels of each pixel; or
is configured to be applied in a smoothing operation.

17. The apparatus of claim 4, wherein the one or more programs of the fragment shader are further configured to write each channel of the input data stream into a display buffer.

18. The method of claim 9, further comprising:
implementing a fragment shader comprising one or more programs to parallel process two of more channels of a pixel of the input data stream, said parallel processing comprising filtering a pixel with a filter kernel, and thereafter performing at least one of thresholding, saturation, and gamma correction to produce a processed pixel value for the pixel; and
generating a processed cell image based on the parallel processing of the two or more channels of the pixel of the input data stream.

19. The method of claim 18, wherein the filter kernel:
comprises a texture for application to one or more channels of the two or more channels of the pixel; or
is applied in a convolution operation comprising a smoothing operation.

20. The method of claim 18, wherein implementing the one or more programs of the fragment shader comprises writing each channel of the input data stream into a display buffer.

* * * * *